Jan. 26, 1954     G. P. BAZE     2,667,379
PLASTIC TRACTOR CAB
Filed May 29, 1952     2 Sheets-Sheet 1
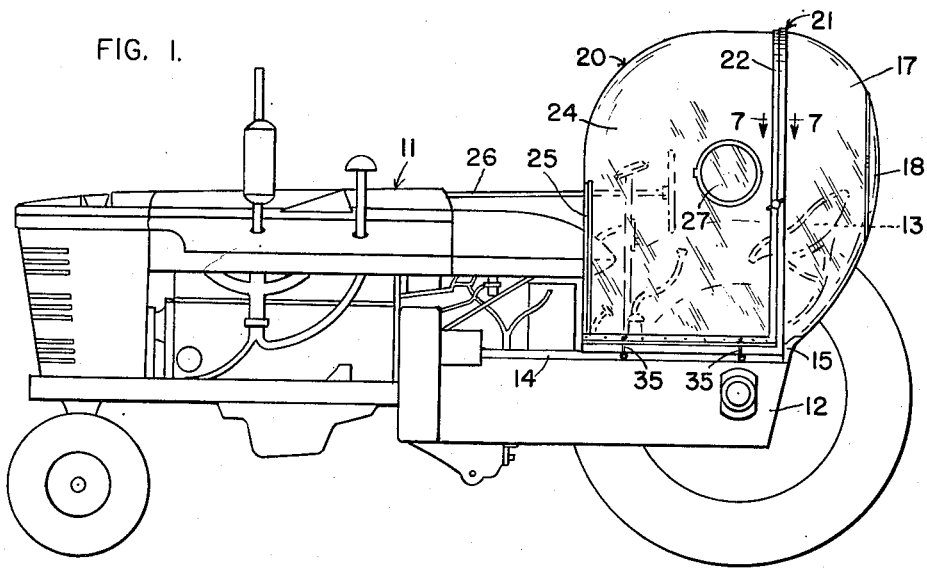
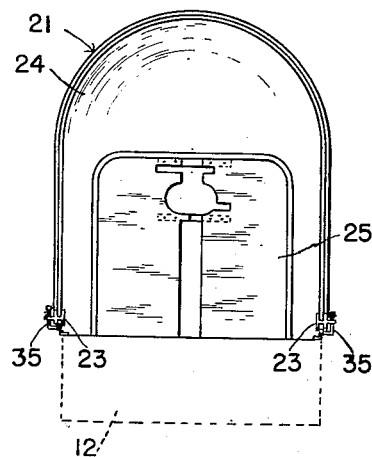
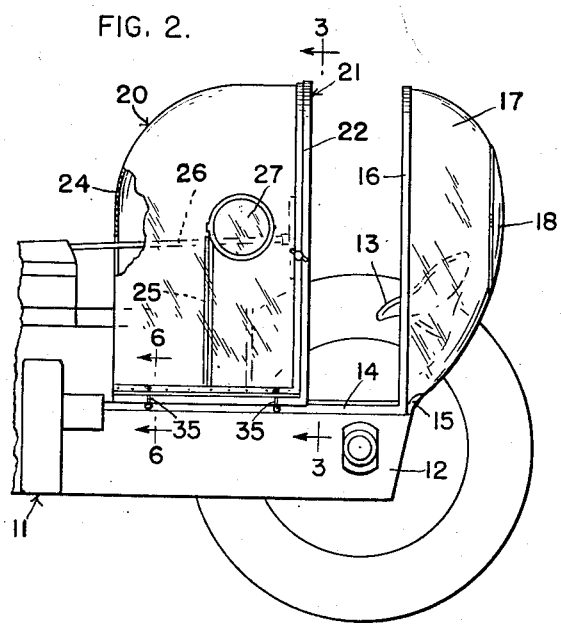
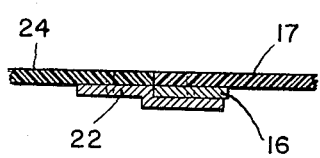
INVENTOR
GRADY P. BAZE
BY
*McMorrow, Berman & Davidson*
ATTORNEYS Jan. 26, 1954
G. P. BAZE
2,667,379
PLASTIC TRACTOR CAB
Filed May 29, 1952
2 Sheets-Sheet 2
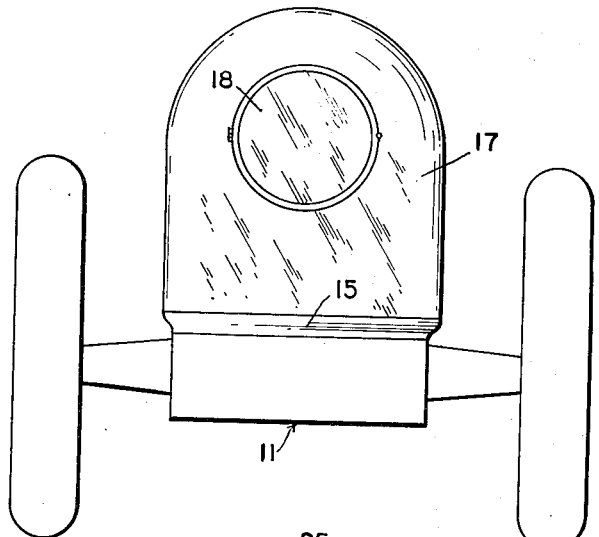
FIG. 4.
FIG. 8.
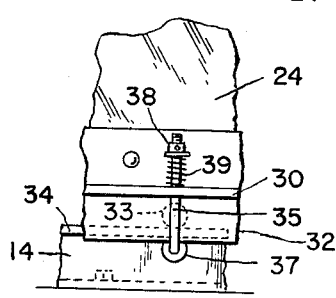
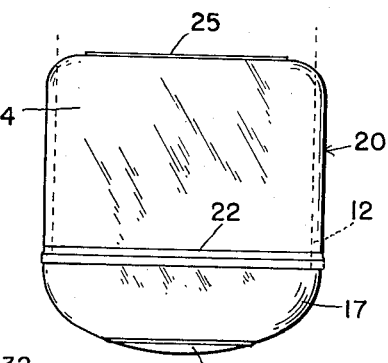
FIG. 5.
FIG. 6.
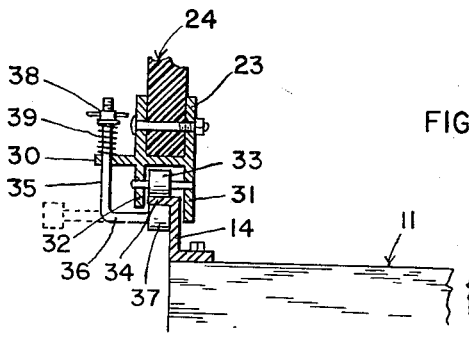
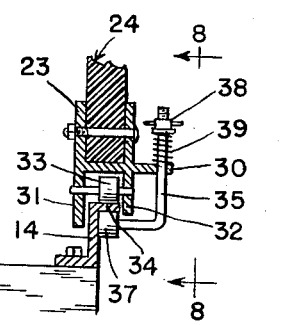
INVENTOR
GRADY P. BAZE
BY
McMorrow, Berman & Davidson
ATTORNEYS Patented Jan. 26, 1954

2,667,379

UNITED STATES PATENT OFFICE 2,667,379

PLASTIC TRACTOR CAB

Grady P. Baze, Idalou, Tex.

Application May 29, 1952, Serial No. 290,731

3 Claims. (Cl. 296—102)

This invention relates to improvements in cabs for tractors and the like.

The main object of the invention is to provide a novel and improved tractor cab providing a high degree of visibility therethrough, said cab being simple in construction, being easy to install on a tractor, and being easy to open and close.

A further object of the invention is to provide an improved tractor cab of inexpensive construction which is light in weight and which is easy to manipulate, the improved cab involving only a few parts, being durable in construction, and providing excellent protection against cold, dust, and wind, as well as other weather conditions.

Further objects and advantages of the invention will become apparent from the following description and claims, and from the accompanying drawings, wherein:

Figure 1 is a side elevational view of a conventional farm tractor equipped with an improved cab constructed in accordance with the present invention.

Figure 2 is a fragmentary side elevational view of the rear portion of the tractor of Figure 1, showing the tractor cab in open position.

Figure 3 is a vertical transverse cross sectional view taken on the line 3—3 of Figure 2.

Figure 4 is a rear elevational view of the tractor, showing the back of the cab.

Figure 5 is a top plan view of the tractor cab employed in Figures 1 to 4.

Figure 6 is an enlarged transverse vertical cross sectional view taken on the line 6—6 of Figure 2.

Figure 7 is an enlarged cross sectional detail view taken on the line 7—7 of Figure 1.

Figure 8 is a side elevational detail view of a portion of the tractor cab showing one of the yieldable retaining members engaging a portion of one of the guide rails to retard sliding movement of the cab, said view being taken substantially on the line 8—8 of Figure 6.

Referring to the drawings, 11 designates a conventional tractor having a frame including the rearwardly extending horizontal longitudinal side members 12. Mounted in the conventional manner on the rear portion of the frame is the operator's seat 13.

Designated 14, 14 are generally Z-shaped cross section guide rails which are secured to and extend along the upper part of the side members 12 and which are connected at their rear ends to a cross bar 15 and to the lower ends of the legs of an inverted U-shaped rear cab section frame, to which is secured the forward margin of the concave rear cab section 17, the said forward margin of the rear cab section being secured to the frame 16 and at its bottom margin to the cross bar 15. The rear cab section 17 faces forwardly, as is clearly shown in Figure 2, and is disposed rearwardly adjacent to and partially encloses the operator's seat 13. The rear cab section 17 is made of transparent plastic material, such as "Plexiglas" and is provided with a hinged rear window 18 which is likewise made of transparent plastic material, such as "Plexiglas."

Designated 20 is the concave front cab section which comprises a reinforcing marginal frame 21 having an inverted U-shaped portion 22 of substantially Z-shaped cross sectional configuration, as shown in Figure 7, and having the horizontal, longitudinally extending side legs 23, 23. Secured at its margin to the frame 21 is the concave front cab section body 24 of transparent plastic material, such as "Plexiglas" or the like, which faces rearwardly and opposes the stationary rear cab section 17, as shown in Figure 3. Interiorly secured across the tractor body at its rear end is a flat vertical reinforcing plate 25 which is apertured to pass the steering wheel shaft 26 of the tractor, and the front cab section body 24 is apertured in registry with the aperture in the plate 25, which the front cab section 20 can be freely moved longitudinally of the tractor frame relative to the rear cab section, as hereinafter explained.

The front cab section 20 is provided in its side walls with the hinged windows 27.

Referring now to Figure 6, it will be seen that each of the front cab section frame legs 23 includes a horizontal lateral flange 30 and the depending vertical flanges 31 and 32. Journaled between the vertical flanges 31 and 32 are rollers 33 which roll upon the top flanges 34 of the guide rails 14 and support the housing element 20 for movement along said guide rails. Designated at 35 are respective rod members extending vertically through the outer portions of the lateral flanges 30 and are rotatable as well as vertically movable in said flanges. Each rod element 35 is formed at its lower portion with a rightangled arm 36 on which is journaled a roller 37 engaging the bottom surface of the top flange 34 of the related guide rail 14. Threaded on the top portions of the rod members 35 are the tensioning nuts 38 and surrounding the rod members 35 below the nuts are the coiled springs 39 which are compressed between the nuts 38 and the lateral flanges so as to bias the rod members 35 upwardly. The biasing action provided by the springs 39 causes the rollers 37 to freely engage the bottom surfaces of the lateral flanges 34 and thereby frictionally retard sliding movement of the front cab section 20 along the guide rails 14, the degree of retardation being predetermined by adjustment of the nuts 38.

Referring now to Figure 7 it will be seen that when the front cab section 20 is moved rearwardly into engagement with the rear cab section 17, the margin of the rear cab section 17 and its frame 16 are received inside the outwardly offset portion of the reinforcing frame 22, whereby a tight seal is provided between the margins of the cab sections when the front cab section 20 is in closed position. This provides excellent protection for the operator of the tractor against cold, dust and wind, or other weather conditions, without interfering with the operator's vision, since the transparent plastic material of the cab section gives the operator of the tractor a clear view even when the cab is tightly closed. To close the cab, it is merely necessary to move the front cab section 20 rearwardly until the margin of the rear cab section is received inside the outwardly offset portion of the frame 22, as above described. The cab is opened by a reverse procedure.

When it is desired to provide free movement of the front cab section 20 on the rails 14, the rod elements 35 may be rotated outwardly to their dotted line positions shown in Figure 6, for example, so that the rollers 37 are disengaged from the under surfaces of the flanges 34 of the guide rails. The nuts 38 may be loosened to allow the arms 36 of the rod members 35 to be thus swung outwardly, and to be swung inwardly into engagement with the flanges 34 when it is again desired to provide a retarding means for retarding the sliding movement of the front cab section 20 on the rails.

While a specific embodiment of an improved tractor cab device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle cab, a forwardly facing concave rear cab section and a rearwardly facing concave front cab section, said cab sections having marginal edges including lower edges, a pair of laterally spaced horizontal guide rails having rear ends, a cross bar extending between and fixed to the rear ends of said guide rails, an inverted U-shaped rear cab section frame having legs having lower ends secured to the rear ends of the guide rails, the marginal edges of the rear cab section being secured to and extending around said rear cab section frame with the lower edge of the rear cab section secured to said cross bar, a front cab section frame comprising horizontal legs having rear ends and an inverted U-shaped portion fixed to and rising from the rear ends of said horizontal legs, the marginal edges of the front cab section being secured to said inverted U-shaped portion and the lower edges of the front cab section being secured to and extending along said horizontal legs, and means mounting said horizontal legs on and confining said horizontal legs to movement along said guide rails for moving said front cab section from a closed position in which the front cab section inverted U-shaped frame portion is in engagement with the rear cab section inverted U-shaped frame to an open position away from said rear cab section.

2. In a vehicle cab, a forwardly facing concave rear cab section and a rearwardly facing concave front cab section, said cab sections having marginal edges including lower edges, a pair of laterally spaced horizontal guide rails having rear ends, a cross bar extending between and fixed to the rear ends of said guide rails, an inverted U-shaped rear cab section frame having legs having lower ends secured to the rear ends of the guide rails, the marginal edges of the rear cab section being secured to and extending around said rear cab section frame with the lower edge of the rear cab section secured to said cross bar, a front cab section frame comprising horizontal legs having rear ends and an inverted U-shaped portion fixed to and rising from the rear ends of said horizontal legs, the marginal edges of the front cab section being secured to said inverted U-shaped portion and the lower edges of the front cab section being secured to and extending along said horizontal legs, and means mounting said horizontal legs on and confining said horizontal legs to movement along said guide rails for moving said front cab section from a closed position in which the front cab section inverted U-shaped frame portion is in engagement with the rear cab section inverted U-shaped frame to an open position away from said rear cab section, said mounting means comprising flanges extending along said guide rails, fixed rollers on said front cab section frame legs engaging one side of said flanges, and spring pressed rollers on said front cab section frame legs engaging the other side of said flanges, said spring pressed rollers serving to retard movement of the front cab section toward and away from said rear cab section.

3. In a vehicle cab, a forwardly facing concave rear cab section and a rearwardly facing concave front cab section said cab sections having marginal edges including lower edges, a pair of laterally spaced horizontal guide rails having rear ends, a cross bar extending between and fixed to the rear ends of said guide rails, an inverted U-shaped rear cab section frame having legs having lower ends secured to the rear ends of the guide rails, the marginal edges of the rear cab section being secured to and extending around said rear cab section frame with the lower edge of the rear cab section secured to said cross bar, a front cab section frame comprising horizontal legs having rear ends and an inverted U-shaped portion fixed to and rising from the rear ends of said horizontal legs, the marginal edges of the front cab section being secured to said inverted U-shaped portion and the lower edges of the front cab section being secured to and extending along said horizontal legs, and means mounting said horizontal legs on and confining said horizontal legs to movement along said guide rails for moving said front cab section from a closed position in which the front cab section inverted U-shaped frame portion is in engagement with the rear cab section inverted U-shaped frame to an open position away from said rear cab section, said mounting means comprising flanges extending along said guide rails, fixed rollers on said front cab section frame legs engaging one side of said flanges, and spring pressed rollers on said front cab section frame legs engaging the other side of said flanges, said spring pressed rollers serving to retard movement of the front cab section toward and away from said rear cab section, said spring pressed rollers being pivoted on said horizontal legs to swing into and out of engagement with the said flanges.

GRADY P. BAZE.

References Cited in the file of this patent

UNITED STATES PATENTS

| Number | Name | Date |
|---|---|---|
| 1,868,382 | Coadou | July 19, 1932 |
| 2,563,845 | Johnson | Aug. 14, 1951 |
| 2,583,918 | Wilson | Jan. 29, 1952 |

FOREIGN PATENTS

| Number | Country | Date |
|---|---|---|
| 319,966 | Great Britain | Oct. 3, 1929 |
| 504,212 | Great Britain | Apr. 21, 1939 |
| 660,542 | Great Britain | Nov. 7, 1951 |